(12) United States Patent
Pelrine et al.

(10) Patent No.: US 7,052,594 B2
(45) Date of Patent: May 30, 2006

(54) DEVICES AND METHODS FOR CONTROLLING FLUID FLOW USING ELASTIC SHEET DEFLECTION

(75) Inventors: Ronald E. Pelrine, Boulder, CO (US); Roy D. Kornbluh, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 644 days.

(21) Appl. No.: 10/066,407

(22) Filed: Jan. 31, 2002

(65) Prior Publication Data

US 2003/0141473 A1 Jul. 31, 2003

(51) Int. Cl.
*C30B 9/14* (2006.01)
*C25B 9/00* (2006.01)

(52) U.S. Cl. .................. 205/687; 204/261; 204/252; 204/263; 204/257

(58) Field of Classification Search ............... 205/687; 204/257, 261, 252, 263
See application file for complete search history.

(56) References Cited

U.S. PATENT DOCUMENTS

| | | | | |
|---|---|---|---|---|
| 4,472,255 | A | * 9/1984 | Millington et al. | .......... 204/255 |
| 4,592,383 | A | * 6/1986 | Rikuta | .................. 137/454.6 |
| 4,869,282 | A | 9/1989 | Sittler et al. | |
| 5,368,704 | A | 11/1994 | Madou et al. | |
| 5,499,127 | A | * 3/1996 | Tsubota et al. | ................ 359/80 |
| 5,876,675 | A | 3/1999 | Kennedy | |
| 6,089,701 | A | * 7/2000 | Hashizume et al. | .......... 347/70 |
| 6,117,396 | A | 9/2000 | Demers | |
| 6,268,219 | B1 | 7/2001 | McBride et al. | |

FOREIGN PATENT DOCUMENTS

| | | |
|---|---|---|
| WO | WO 98/35529 | 8/1998 |
| WO | WO 01/01025 | 1/2001 |
| WO | WO 01/06575 | 1/2001 |
| WO | WO 01/06579 | 1/2001 |
| WO | WO 01/58973 | 8/2001 |
| WO | WO 01/59852 | 8/2001 |

OTHER PUBLICATIONS

Pelrine et al. (2000), "High–Speed Electrically Actuated Elastomers with Strain Greater than 100%," *Science* 287:836–839, no month.
Unger et al. (2000), "Monolithic Microfabricated Valves and Pumps by Multilayer Soft Lithography," *Science* 288:113–116, no month.
Whitesides et al. (2001), "Flexible Methods for Microfluidics," *Physics Today* 52(6):42–47, no month.
U.S. patent application Ser. No. 10/059,033, Pelrine et al.

* cited by examiner

*Primary Examiner*—Donald R Valentine
(74) *Attorney, Agent, or Firm*—Reed & Eberle LLP

(57) ABSTRACT

The invention relates to devices that control fluid flow, which comprise a substrate having an upper surface adapted to contact a flowing fluid and an elastic sheet immobilized with respect to the substrate, typically at a minimum of two immobilization points. The elastic sheet has a deflectable active area at least partially contained between the immobilization points; the lower surface of the sheet faces the upper surface of the substrate. Optionally, two or more electrodes are provided in contact with the active area of the elastic sheet. The device also includes an actuation means for deflecting the active area toward or away from the upper surface of the substrate. Additionally, the invention provides various methods for controlling fluid flow as well as methods for making devices that control fluid flow. The invention is particularly suited for microfluidic applications.

70 Claims, 6 Drawing Sheets

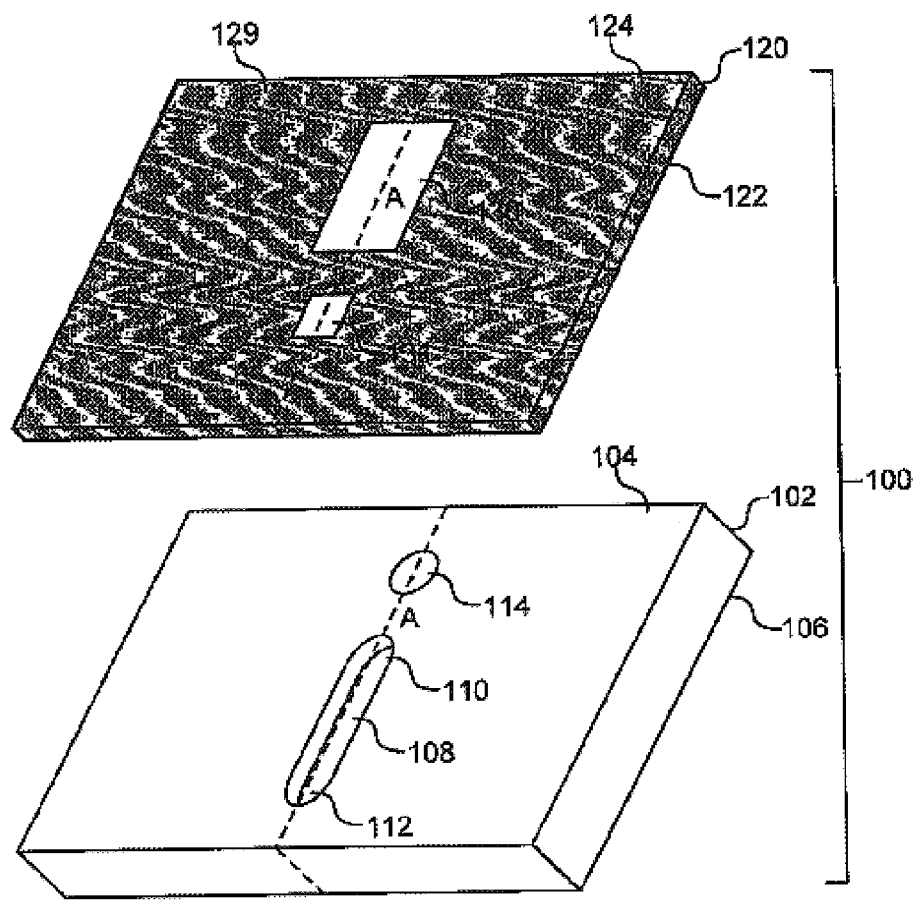
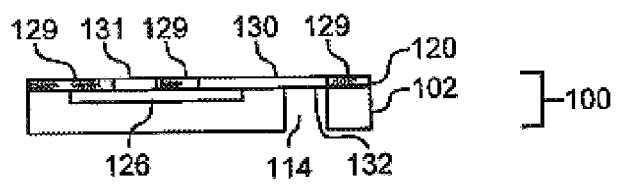
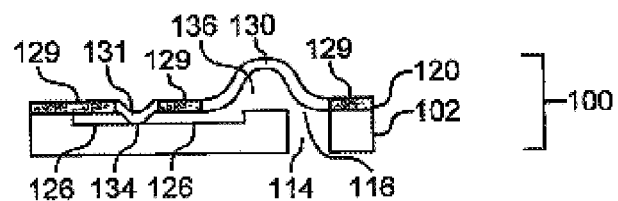

DEVICES AND METHODS FOR CONTROLLING FLUID FLOW USING ELASTIC SHEET DEFLECTION

TECHNICAL FIELD

The present invention relates to fluid flow control using elastic deflection. In particular, the invention relates to devices formed from a substrate and an elastic sheet in partially immobilized relationship to each other, wherein deflection of the elastic sheet provides control over fluid flow within fluid-transporting features of the substrate.

BACKGROUND

Fluid flow is an important consideration in a number of laboratory processes. Microfluidic technologies, in particular, have recently captured widespread attention in the fields of biological assays, clinical diagnostics, and synthetic and analytical chemistry. These technologies represent a significant advancement, particularly for those applications such as proteomics and genomics, in which expensive or rare fluids are employed. Typically, microfluidic systems miniaturize and automate a number of laboratory processes that are then integrated on a chip. Each chip may contain a network of microscopic channels through which fluids and chemicals are transported in order to perform experiments. Thus, microfluidic devices are particularly suited for the analysis of minute sample quantities.

Microfluidic devices are typically produced employing the same microfabrication methods that are used to make microchips in the computer industry, enabling the creation of intricate, minute patterns of interconnected channels. Once a pattern is created, microchip manufacturing methods are employed to recreate the channel design in a substrate formed from a rigid material such as silicon, quartz, glass, or plastic. This process allows the development of highly precise channels with dimensions that can be varied in their width and depth. Once the pattern is produced in the substrate, a rigid cover plate is affixed over the substrate so as to form conduits in combination with the channels. Because microfluidic devices may be constructed using simple manufacturing techniques, they are generally inexpensive to produce.

Microfluidic devices do, however, present certain technical challenges that need to be overcome. For example, fluid flow characteristics within the small flow channels of a microfluidic device may differ from fluid behavior in larger devices, since surface effects tend to predominate, and regions of bulk flow become proportionately smaller. Consequently, several techniques have been developed in order to achieve fluid flow control in microfluidic devices.

Fluid movement in microfluidic devices sometimes involves electrokinetic flow, which is generated by electrodes in reservoirs at each end of a channel that are activated when an external power source applies a voltage across the electrodes. Under these conditions, fluids of the appropriate type will move by electroosmosis, a process that precisely and controllably generates linear flow rates within the channel, typically about a millimeter per second. Electrophoresis, another electrokinetic phenomenon, may also occur in the channels. This involves the movement of charged molecules or particles in an electric field. Electrophoresis is often used in conventional laboratories for analyzing molecules according to their chemical structures. Electrophoresis can be used to move molecules in solution, or to separate molecules with subtle chemical variations. Electrophoresis and electroosmosis generally occur in channels simultaneously, as described, for example, in U.S. Pat. No. 5,876,675 to Kennedy.

In addition, or in the alternative, pressure can be used to move fluid in the channels. For example, U.S. Pat. No. 6,117,396 to Demers describes a device for delivering defined volumes of a liquid. The device employs one or more sources of gas to pressurize metering capillaries containing liquid therein and to expel liquid therefrom. Generally, on the microfluidic scale, small amounts of pressure may produce predictable and reproducible fluid flow through microfluidic fluid-transporting features. However, the size of fluid-transporting features plays an important role in fluid flow. U.S. Pat. No. 6,268,219 to Mc Bride et al. describes a fluid distribution system that may be used to evenly distribute fluid to a plurality of channels that branch successively from a main channel by controlling the size of apertures that serve to couple the main channel with the branching channels.

A number of patents describe various mechanical valve technologies that in theory may be employed in microfluidic devices. U.S. Pat. No. 4,869,282 to Sittler et al., for example, describes a micromachined valve that employs a control force to deflect a polyimide film diaphragm. The polyimide film diagraph is sealed to a micromachined silicon layer having flow channels on a surface thereof. U.S. Pat. No. 5,368,704 to Madou et al. describes a micromachined valve that can be opened and closed electrochemically. The micromachined valve operates by employing an electrolytic film material, which may be repeatedly dissolved and redeposited in and from a compatible electrolyte to open and close the valve. Suitable materials include, for example, metals, such as silver or copper, or electroactive polymers, such as polypyrrole. Successful integration of mechanical valve structures into microfluidic devices, however, remains an elusive goal.

In addition, there are a number of other drawbacks and limitations in microfluidic device construction. For example, the stiffness of the materials used for microfluidic device formation necessitates high actuation forces, which in turn may result in large and complex designs. To overcome limitations associated with ordinary microfluidic devices formed from rigid materials, microfabricated elastomeric valve and pump systems have been proposed in WO01/01025. Similar valves and pumps are also described in Unger et al. (2000), "Monolithic Microfabricated Valves and Pumps by Multilayer Soft Lithography," *Science* 288:113–116. These publications describe soft lithography as an alternative to silicon-based micromachining as a means by which to form microfluidic devices. Through soft lithography, microfluidic structures created entirely from an elastomer may be constructed containing on/off valves, switching valves, and pumps. The structures comprise an elastomeric block having a microfabricated recess formed therein. Actuation of a portion of the elastomeric block results in the deflection of that portion into the recess. Thus, the microfluidic valves described in this publication are subject to disadvantages, such as always remaining open in an unactuated state. Furthermore, the valves typically require mechanical or pressure-based actuation and are not easily adapted for electrical control.

Electroactive polymers have been described in Peirine et al. (2000), "High-Speed Electrically Actuated Elastomers with Strain Greater than 100%," Science 287:836–839, as well as in a number of PCT publications. (See WO01/58973, WO01/59852, WO01/06575, and WO01106579.) Such electroactive polymers represent a low-cost, high-performance actuator material capable of converting electrical energy into mechanical energy, and are of particular interest because they can be tailored to suit specific purposes. For example, the electroactive polymers described in these publications have been employed to form transducers, such as in the conversion of electrical energy into mechanical energy (and vice versa). By applying an electric field to at least two electrodes that are in contact with the electroactive polymer, the polymer may be deflected due to linear elastic strains in excess of about 100 percent. Such deflections may be exploited for use in fluid flow control devices, particularly in microfluidic or small devices.

Thus, there exists a need in the field of fluid flow control, particularly in microfluidics, to employ elastic materials as alternatives to already known fluid flow control technologies. Electroactive polymers, in particular, make it possible for electrically controllable valve and pumps to provide mechanical fluid control.

SUMMARY OF THE INVENTION

In one aspect, the invention relates to a fluid flow control device. The device is formed from a substrate having an upper surface adapted to contact a flowing fluid and an elastic sheet immobilized with respect to the substrate at a minimum of two immobilization points. The elastic sheet has an upper surface, an opposing surface facing the upper surface of the substrate, and a deflectable active area at least partially contained between the immobilization points. Preferably the entire elastic sheet, except for the active area, is immobilized with respect to the substrate. The device further includes an actuation means for deflecting the active area away from the upper surface of the substrate.

The active area may be deflected away from the upper surface of the substrate through any number of means, but a nonmechanical means is preferred. For example, a nonmechanical means may be adapted to apply an electric field to the active area. Thus, the device typically comprises two electrodes in contact with the active area of the elastic sheet, wherein the actuation means is operatively connected to the electrodes. The electrodes are preferably located on opposing surfaces of the active area.

In another aspect, the invention relates to a microfluidic device similar to the fluid flow control device as described above, except that the substrate has at least two fluid-transporting microfeatures formed on an upper surface thereof. When the actuation means is actuated, the active area is deflected away from the upper surface of the substrate, thereby increasing fluid communication to the fluid-transporting features.

In still another aspect, the invention relates to a fluid flow control device similar to that described above, except that a plurality of fluid-transporting features is formed on the upper surface of the substrate. The elastic sheet is immobilized with respect to the substrate at a plurality of immobilization points and has a plurality of deflectable active areas each at least partially contained between two immobilization points. Each fluid transporting feature on the substrate surface directly faces an active area of the elastic sheet. The actuation means is provided for deflecting each active area away from the upper surface of the substrate.

Preferably, the actuation means allows for individual actuation of each active area. Thus, when electrodes are provided in contact with the active areas, the actuation means may be adapted to selectively apply an electric field to each of the active area.

In a further aspect, the invention relates to a fluid flow control device as described above, except that at least two electrodes are provided in contact with the active area of elastic sheet and the lower surface of active area may be deflected toward or away from the upper surface of the substrate. In addition, the actuation means is adapted for nonmechanical actuation of the active area. Thus, the actuation means may be adapted to apply an electric field to the active area by charging the electrodes as well as to deflect the active area. Similarly, the device may include a plurality of active areas and/or be adapted for microfluidic applications by providing microscale fluid-transporting features on the substrate surface.

Typically, the upper surface of the substrate for any of the inventive devices is substantially planar and may further comprise a fluid-transporting feature on the upper surface of the substrate and at least partially between the immobilization points. In addition, the substrate is typically substantially more rigid than the elastic sheet and may be comprised of a material selected from the group consisting of metals, ceramics, semiconductors, polymers, composites thereof, and laminates thereof.

The elastic sheet of any of the inventive devices is typically comprised of a polymeric material and has a substantially uniform thickness. Preferably, the active area of the elastic sheet, or the entire elastic sheet, is prestrained through this is not a necessity. In some instances, the active area may be deflected away from the upper surface of the substrate through a linear strain of at least about 10 percent. In more preferred instances, the active area may be deflected away from the substrate through a linear strain of at least about 50 percent. The elastic sheet may be comprised of an electroactive polymer attached to the upper surface of the substrate and arranged in such a manner as to cause the polymer in the active area to deflect in response to a change in electric field.

Depending on the intended use of the inventive device, the lower surface of the active area in an unactuated state may exhibit either conformal or nonconformal contact with the upper surface of the substrate. In such cases, the lower surface of the active area, after actuation and in combination with the upper surface of the substrate, may form a fluid-transporting feature. In some instances, however, a fluid-transporting feature may be formed by the combination of the upper substrate surface and the lower surface of the active area before actuation.

The inventive device may represent a component of a number of different devices that handle fluids including, but not limited to, valves, pumps, or mixers.

In another aspect, the invention relates to a method for forming a fluid flow control device, comprising the steps of: (a) providing a substrate having an upper surface; (b) placing an elastic sheet in immobilized relationship to the substrate at a minimum of two immobilization points, thereby positioning an active area of the elastic sheet between the immobilization points over the upper surface of the substrate; and (c) operatively connecting an actuation means to the active area, such that a lower surface of the active area that opposes the upper surface of the substrate may be deflected away from or toward the upper surface of the substrate upon operation of the actuation means.

The invention also relates to various methods for controlling fluid flow. In one embodiment, providing a device comprising a substrate and an elastic sheet immobilized with respect thereto at a minimum of two immobilization points, wherein the elastic sheet has an active area at least partially contained between the immobilization points and in fluid-tight contact with an upper surface of the substrate. The active area is deflected away from the upper surface of the substrate, thereby forming a fluid-transporting feature between the active area and the upper surface of the substrate. In another embodiment, a device is provided that comprises a substrate and an elastic sheet immobilized with respect thereto at a minimum of two immobilization points, wherein the elastic sheet has an active area at least partially contained between the immobilization points and two electrodes in contact with the active area such that fluid may flow between the active area and an upper surface of the substrate. An electric potential is applied to the electrodes to deflect the active area toward the upper surface of the substrate such that fluid-tight contact is achieved between the surfaces. When a plurality of active area are provided, actuation of the active areas may result in some active areas deflected toward the substrate and other active areas deflected away from the substrate.

BRIEF DESCRIPTION OF THE DRAWINGS

FIG. 1A illustrates the device in exploded view. FIGS. 1B and 1C schematically illustrate in cross-sectional side view along dotted line A the device before and after actuation, respectively.

FIG. 2A illustrates the device in exploded view. FIGS. 2B and 2C schematically illustrate in cross-sectional side view along dotted line A the device before and after actuation, respectively.

FIG. 3A illustrates the device in exploded view. FIG. 3B schematically illustrates in cross-sectional side view along dotted line A the device before actuation. FIGS. 3C and 3D schematically illustrate the device wherein the active area is deflected respectively toward, then away from, the upper surface of the substrate.

FIG. 4A illustrates the device in exploded view. FIG. 4B schematically illustrates in cross-sectional side view along dotted line A the device in an unactuated configuration. FIG. 4C schematically illustrates the device in an actuated configuration wherein the active area is deflected toward the upper surface of the substrate.

FIGS. 5A–5C, collectively referred to as FIG. 5, illustrate a still further version of the inventive device wherein the elastic sheet has a plurality of active areas that may be individually actuated. FIG. 5A illustrates the device in exploded view. FIGS. 5B and 5C schematically illustrate in cross-sectional side view the device wherein each of the active areas is in unactuated and actuated configurations, respectively.

DETAILED DESCRIPTION OF THE INVENTION

Figure 1A:
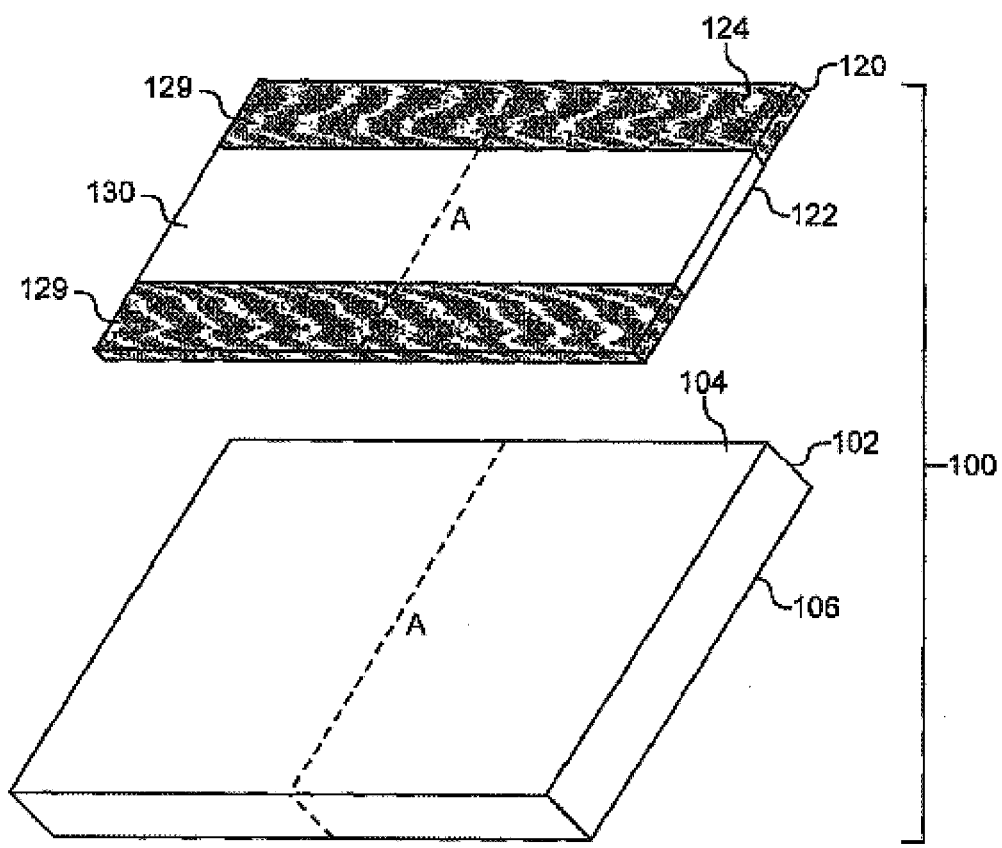
FIGS. 1A–1C, collectively referred to as FIG. 1, illustrate a version of the inventive device, wherein an active area of elastic sheet, after actuation, is deflected away from a substrate surface to form a conduit extending along the length of the substrate.

Before the invention is described in detail, it is to be understood that unless otherwise indicated, this invention is not limited to particular materials, components, or manufacturing processes, as such may vary. It is also to be understood that the terminology used herein is for purposes of describing particular embodiments only, and is not intended to be limiting.

It must be noted that, as used in the specification and the appended claims, the singular forms "a," "an," and "the" include plural referents unless the context clearly dictates otherwise. Thus, for example, reference to "an active area" includes a plurality of active areas, reference to "a immobilization point" includes a locus of immobilization points, reference to "a feature" includes a plurality of features, and the like.

In this specification and in the claims that follow, reference will be made to a number of terms that shall be defined to have the following meanings:

The term "active area" as used herein refers to a portion of an elastic sheet having at least a lower surface that is mobile with respect to the substrate. Depending on the particular device, at least the lower surface of the active area, after actuation, is typically deflected with respect to the upper surface of substrate. Optionally, the entire active area, after actuation, may be deflected with respect to the substrate.

The term "elastic," as in "elastic sheet," is used herein in its ordinary sense and refers to the capacity to resume easily to an original shape after deflection or deformation.

The term "flow path" as used herein refers to the route or course along which a fluid travels or moves. Flow paths are formed from one or more fluid-transporting features of a microdevice.

The term "fluid-transporting feature" as used herein refers to an arrangement of solid bodies or portions thereof that direct fluid flow. Fluid-transporting features include, but are not limited to, chambers, reservoirs, conduits, and channels. The term "conduit" as used herein refers to a three-dimensional enclosure formed by one or more walls and having an inlet opening and an outlet opening through which fluid may be transported. The term "channel" is used herein to refer to an open groove or a trench in a surface. A channel in combination with a solid piece over the channel forms a conduit.

The term "fluid-tight" is used herein to describe the spatial relationship between two solid surfaces in physical contact such that fluid is prevented from flowing into the interface between the surfaces.

The prefix "micro," as in "microfluidic device," refers to a device having features of micron or submicron dimensions, and which can be used in any number of chemical processes involving very small amounts, i.e., "microscale" amounts, of fluid. The features of the microdevices are adapted to the particular use of the microfluidic device. For example, microchannels (termed "microconduits" herein when enclosed on the order of 1 µm to 200 µm in diameter, typically 10 µm to 75 µm in diameter, and approximately 100 µm to 50 cm in length. Microchambers, as another example, may have a volume of about 1 nl to about 100 µl, typically about 10 nl to 20 µl.

"Optional" or "optionally" as used herein means that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

The term "point" is used herein in its ordinary sense and refers to a dimensionless object having no properties except location. Thus, for example, a plurality of "immobilization points" may represent an "immobilization area."

Thus, in a first embodiment, the inventive fluid flow control device comprises a substrate having an upper surface adapted to contact a flowing fluid and an elastic sheet immobilized with respect to the substrate at a minimum of two immobilization points. The elastic sheet has an upper surface, a lower surface, and a deflectable active area at least partially contained between the immobilization points. The lower surface of elastic sheet faces the upper surface of the substrate. The device further includes an actuation means for deflecting the active area away from the upper surface of the substrate.

Figure 1B:
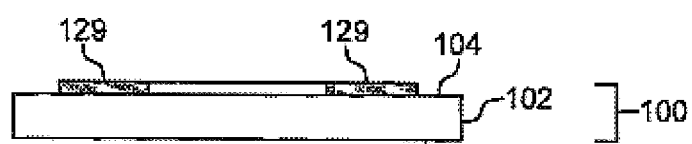
Figure 1C:
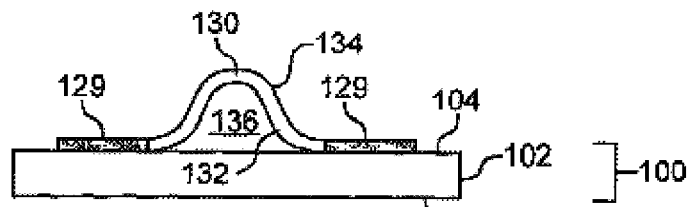

The elastic sheet 120 is substantially immobilized over the upper substrate surface 104 at the shaded areas 129 indicated in FIG. 1. The shaded areas 129 represent a locus of immobilization points to which the elastic sheet 120 is immobilized with respect to the substrate 102. As shown, the elastic sheet 120 is affixed to the upper substrate surface 104. The unshaded area of the elastic sheet represents an active area 130, discussed below. The active area extends the entire length of the elastic sheet and is located between the immobilized areas 129. When in an unactuated state, as illustrated in FIG. 1B, the lower surface 122 and the upper surface 124 of the elastic sheet 120 are substantially planar. As a result, the lower surface 122 of the elastic sheet 120 is capable of interfacing closely with the upper surface 104 of the substrate 102 to achieve fluid-tight contact therebetween. After actuation, however, the lower surface 132 of the active area 130 is deflected away from the upper surface 104 of the substrate 102. As illustrated in FIG. 1C, the entirety of the active area 130 may be deflected, along with its lower surface 132. Since the nonactive portion of the elastic sheet 120 is immobilized with respect to the substrate 102, the upper surface 134 of the active area 130 may bulge upwardly away from the substrate. As a consequence, the lower surface of the active area is no longer in contact with the upper surface of the substrate. Instead, the lower surface of the active area, in combination with the upper surface of the substrate, defines a conduit 136 that extends along the length of the elastic sheet 130 and terminates at openings defined by the edges of the elastic sheet and the substrate. Although the deflection may result in the bowing of the active area as shown in FIG. 1, other deflection actions could occur as well, including, but not limited to, wrinkling, arching, or tunneling as discussed below.

Figure 2A:
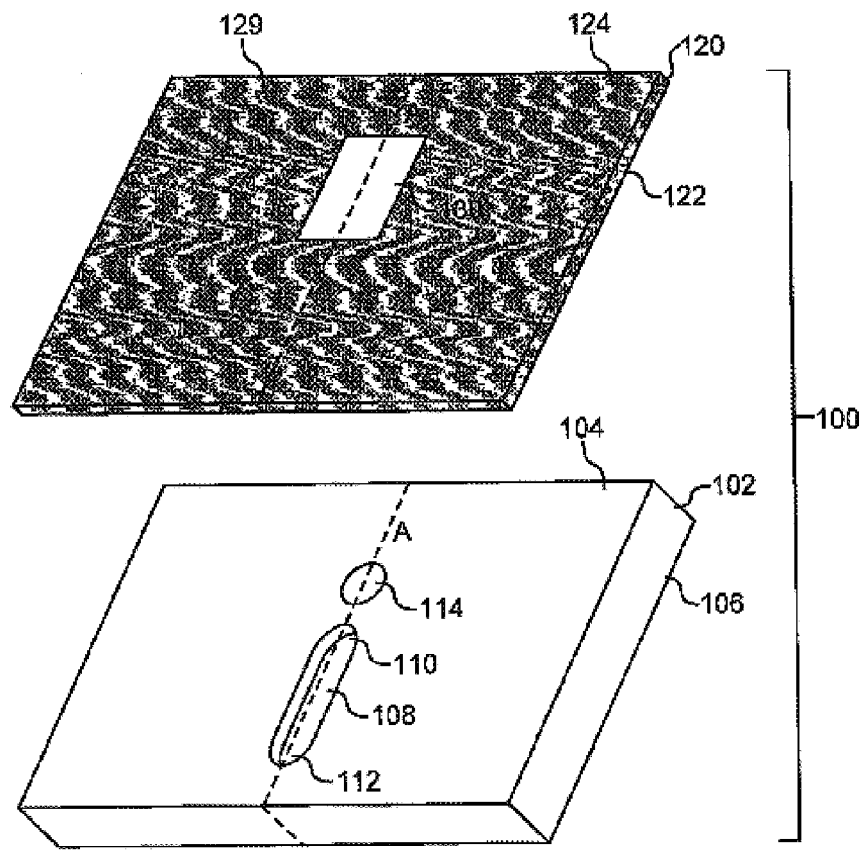
FIGS. 2A–2C, collectively referred to as FIG. 2, illustrate a version of the inventive device, wherein an active area of the elastic sheet, after actuation, is deflected away from a substrate surface to provide communication between two fluid-transporting features.
Figure 2B:
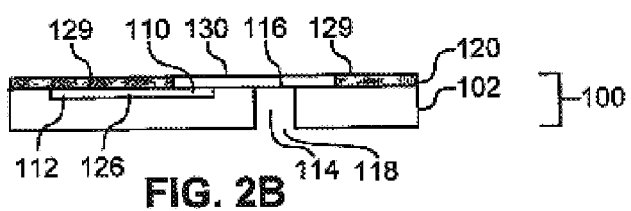

In addition, the inventive device may be constructed to provide fluid communication between two fluid-transporting features, as illustrated in FIG. 2. The device of FIG. 2 is generally similar to that of FIG. 1, but the device of FIG. 1 does not have fluid-transporting features in the upper surface 104 of the substrate. As illustrated in FIG. 2, the features are separate from each other. The first feature is in the form of a channel 108 having two termini indicated at 110 and 112; the second feature is a conduit 114 that extends through the substrate from an opening 116 at the substrate's upper surface 104 to an opening 118 at the substrate's lower surface 106. As shown, terminus 110 represents the portion of channel located closest to the conduit 114. The fluid-transporting features may be formed through mechanical machining, laser ablation, or other techniques discussed below or known in the art. In addition, variations of the geometry and configurations of the fluid transporting features are possible. For example, although channel 108 has been represented in a generally extended form, channels for this and other embodiments can have a variety of configurations, such as a straight, serpentine, spiral, or any tortuous path. Further, as described above, the sample microchannel 108 can assume a wide variety of possible channel geometries, including semi-circular, rectangular, rhomboidal, trapezoidal, circular, ellipsoidal, parabolic, hyperbolic, and polygonal, as well as sections of the above shapes. More complex cross-sectional shapes, such as the embodiment with protrusions as discussed, or an embodiment having concavities in the flow channels, are also contemplated by the present invention. The channels can assume a wide range of aspect ratios.

As before, the device 100 also includes an elastic sheet 120 having lower and upper opposing surfaces indicated at 122 and 124, respectively. However, the elastic sheet 120 is substantially immobilized over the upper surface 104 in a manner somewhat different from that illustrated in FIG. 1, as indicated by the shaded areas of FIG. 2. The shaded area again represents a locus of immobilization points at which the elastic sheet is immobilized with respect to the substrate, and the unshaded area represents an active area 130. As shown, the active area 130 of the elastic sheet is arranged over the entirety of the upper surface opening 116 and over only a portion of the channel 108, specifically terminus 110. When unactuated, the lower surface 122 of the elastic sheet 120, in combination with the channel 108, defines a conduit 126. Because the lower elastic sheet surface, when in an unactuated state, and the upper substrate surface are in fluid-tight contact, the conduit is fluid-tight as well. In addition, the lower surface 122 of the elastic sheet 120, when in an unactuated state, provides a fluid-tight seal against the upper surface opening of the substrate.

Figure 2C:
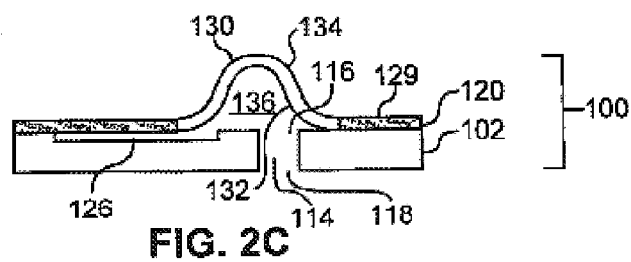

After actuation, the lower surface 132 of the active area 130 is deflected away from the upper surface 104 of the substrate 102. As illustrated in FIG. 2C, the entirety of the active area 130 may be deflected along with its lower surface 132. Since the nonactive portion of the elastic sheet 120 is immobilized with respect to the substrate 102, the upper surface 134 of the active area 130 may bulge upwardly away from the substrate as well. As a consequence, the lower surface of the active area is no longer in contact with the upper surface of the substrate. Instead, the lower surface of the active area, in combination with the upper surface of the substrate, defines a fluid-transporting feature 136 that provides fluid communication between the conduits 114 and 126. In other words, fluid may now be conducted in a flow path that extends in order through conduit 126, fluid-transporting feature 136, opening 116, conduit 114, and opening 118. The fluid-transporting feature may be formed, for example, as a conduit or as a chamber. However, to ensure that the fluid flow characteristics of the fluid-transporting feature is similar to that occurring in any of the fluid-transporting features already present in the device, e.g., on the upper substrate surface, the active area, when in an actuated state, is located at a distance of about 0.1 to about 10 times the dimension of the fluid-transporting feature on the upper surface of the substrate. Preferably, the distance is about 0.5 to about 2 times the dimension of the fluid-transporting feature.

While FIGS. 1 and 2 illustrate typical configurations of the inventive device, other possible configurations may be apparent to one of ordinary skill in the art upon examination of the disclosure contained in this application. For example, FIGS. 1 and 2 each illustrate a fluid flow control device wherein the upper surface of the elastic sheet represents an exterior surface of the device. However, additional layers may be provided over the elastic sheet to enclose it within the interior of the device. In addition, although FIG. 1 illustrates that the lower surface of the active area, when in an unactuated state, conforms generally to the upper surface of the substrate to provide a fluid-tight contact therebetween, this is not always the case. In some instances, the lower surface of the active area may not contact the upper surface of the substrate under any circumstance, and actuation of the active area merely deflects the active area further away from the upper substrate surface. In addition, while both FIGS. 1 and 2, illustrate devices wherein substantially the entire elastic sheet, except for the active area, is in an immobilized relationship with respect to the substrate, this is not necessarily the case with all of the inventive devices.

The elastic sheet can be formed from any suitable material described below. However, care must be taken to ensure proper placement of the active area(s) with respect to the substrate surface for any of the inventive devices. Thus, the elastic sheet may be positioned over the upper substrate surface according to a number of possible alignment means. It should be noted that the elastic sheet and the substrate may be discrete components, or they may be combined as a single flexible piece. Thus, while not necessary in every case, a means of alignment would be preferred due to the flexibility of the elastic sheet.

For the above-described embodiments as well as various embodiments described below, it is important to ensure that the lower surface of the active layer does not adhere or "stick" to the upper surface of the substrate. Such adhesion may occur as a result of electrostatic or other forces. A number of techniques may be employed to reduce or eliminate the potential for such adhesion. In some instances, proper selection of substrate and elastic sheet material will prevent uncontrolled adhesion between the surfaces. In other instances, a non-stick coatings may be applied to contacting surfaces (e.g., upper surface 104 and/or lower surface 132 in FIGS. 1 and 2). In some instances, such uncontrolled adhesion effects may be ameliorated by rapidly and repeatedly actuating the active area, thereby causing the active area to vibrate.

In another embodiment, the inventive fluid flow control device comprises a substrate having an upper surface and an elastic sheet, which is immobilized with respect to the substrate at a minimum of two immobilization points. As before, the elastic sheet has an active area at least partially contained between the immobilization points, and a lower surface of the deflectable active area is arranged to face the upper surface of the substrate. In this embodiment, however, the device further includes at least two electrodes in contact with the active area of elastic sheet and a nonmechanical actuation means for deflecting the active area toward or away from the upper surface of the substrate. It should be noted that nonmechanical actuation refers to actuation that is not purely mechanical in nature. For example, nonmechanical actuation may involve electromechanical actuation FIG. 3 illustrates an example of the inventive device as described above. As before, a substrate 102 is provided comprising upper and lower substantially planar opposing surfaces indicated at 104 and 106, respectively. The device 110 also includes an elastic sheet 120 having lower and upper opposing surfaces indicated at 122 and 124, respectively, arranged over the substrate 102. Located on the lower surface 122 of the elastic sheet is a fluid-transporting feature in the form of a channel 125 extending along the length of the elastic sheet. As is the case with the fluid-transporting features that may be formed on the substrate, the channel may be formed through any method known in the art, and variations of the geometry and configurations of the fluid-transporting feature on the elastic sheet are possible.

The elastic sheet 120 is substantially immobilized over the upper substrate surface 104 at the shaded area 129 indicated in FIG. 3. The shaded area 129 corresponds to the entire lower surface of the elastic sheet, except for the location of the channel, and represents a locus of immobilization points at which the elastic sheet 120 is immobilized with respect to the substrate 102. A portion of the unshaded area of the elastic sheet represents an active area 130. When in an unactuated state, the lower surface 122 of the elastic sheet 120 is capable of interfacing closely with the upper surface 104 of the substrate 102 to achieve fluid-tight contact therebetween. Thus, as shown in FIG. 3B, when the active area is in an unactuated state, the upper substrate surface 104, in combination with the channel 125, defines a conduit 126. Notably, the active area is located over only a portion of the conduit 126 between its ends.

Also provided are two electrodes, indicated at 142 and 144, each in contact with the active area. Upper surface electrode 142 is located at the upper surface of the active area, and lower surface electrode 144 is located at the lower surface of the active area 130. Although these electrodes are shown as having an identical shape, this is not a requirement. These electrodes allow an electric field to be applied to the active area upon nonmechanical actuation.

Figure 3A:
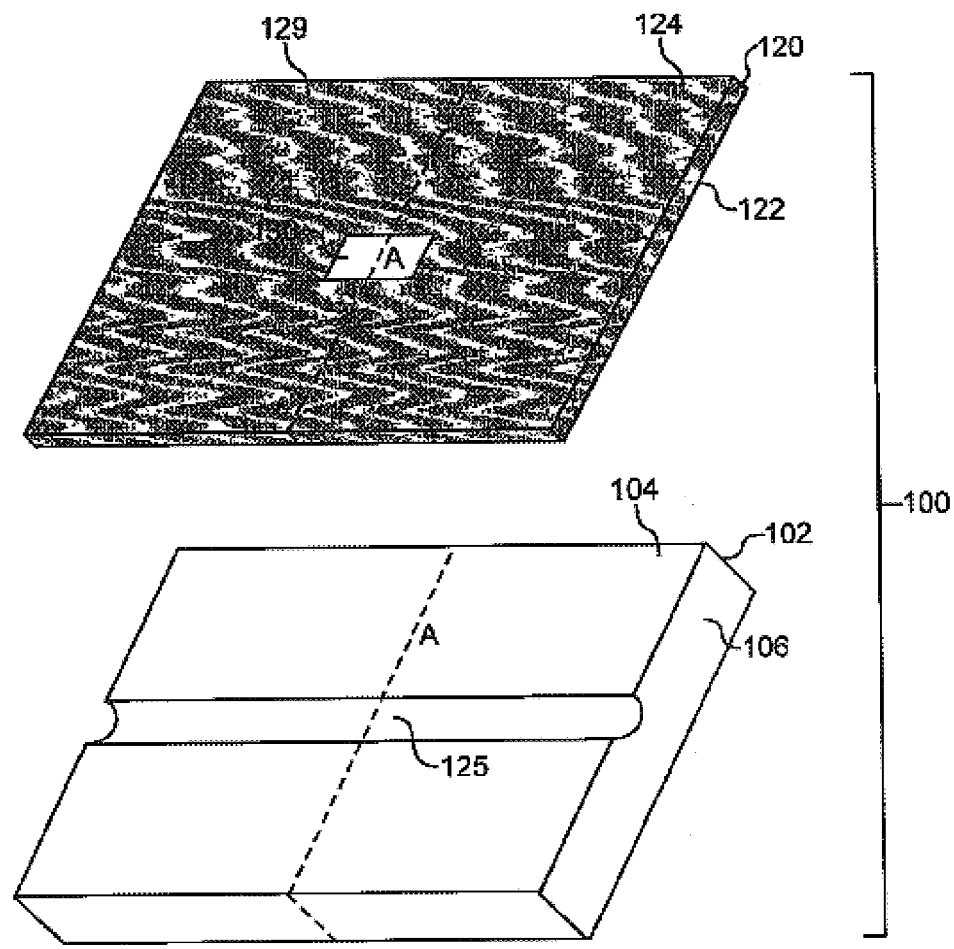
FIGS. 3A–3D, collectively referred to as FIG. 3, illustrate another version of the inventive device, wherein the an active area of the elastic sheet, after actuation, is deflected toward a substrate surface to obstruct a fluid-transporting feature formed in part by a channel in lower surface of the elastic sheet.
Figure 3B:
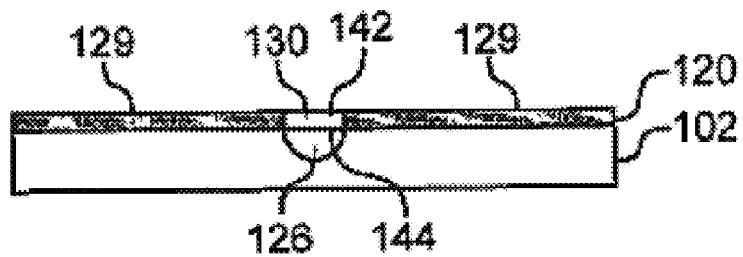
Figure 3C:
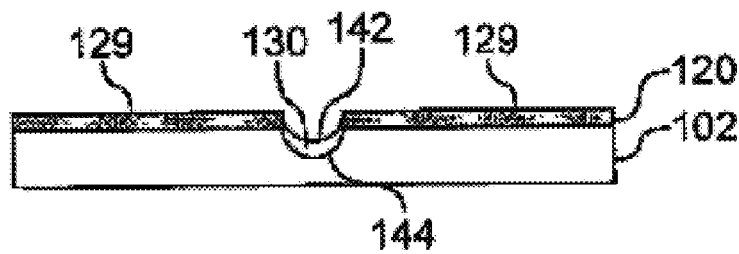
Figure 3D:
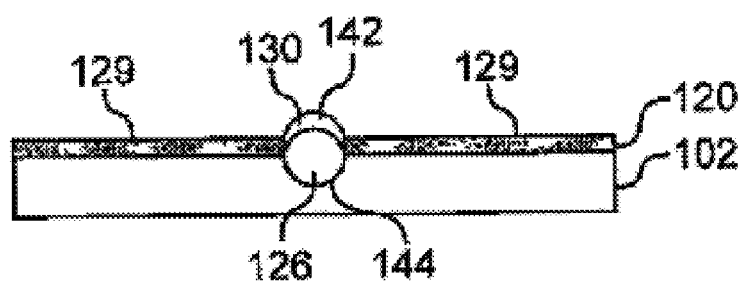

Depending on the construction of the device, actuation may result in the active area being deflected toward or away from the upper substrate surface. FIG. 3C illustrates the deflection of the lower surface 132 of the active area 130 toward the upper substrate surface 104. As illustrated in FIG. 3C, the entirety of the active area 130 is deflected downward, resulting in the constriction of the cross-sectional area of conduit 126 at the active area. The extent of deflection is correlated with the applied electric field. A stronger applied electric field results in greater deflection and linear strain. Thus, a strong electric field may be applied when it is desirable to fluidly isolate the ends of conduit 126, and a weaker electric field may be applied when it is desirable to merely reduce fluid communication between the ends. To ensure that the upper surface of the active area cannot be deflected away from the substrate, an optional rigid cover plate (not shown) may be provided over at least the upper surface of active area of the elastic sheet. Alternatively, as shown in FIG. 3D, the device may be constructed such that the active area, after actuation, is deflected away from the upper surface of the substrate, thereby resulting in conduit 126 having a greater cross-sectional area at the active area.

Figure 4A:
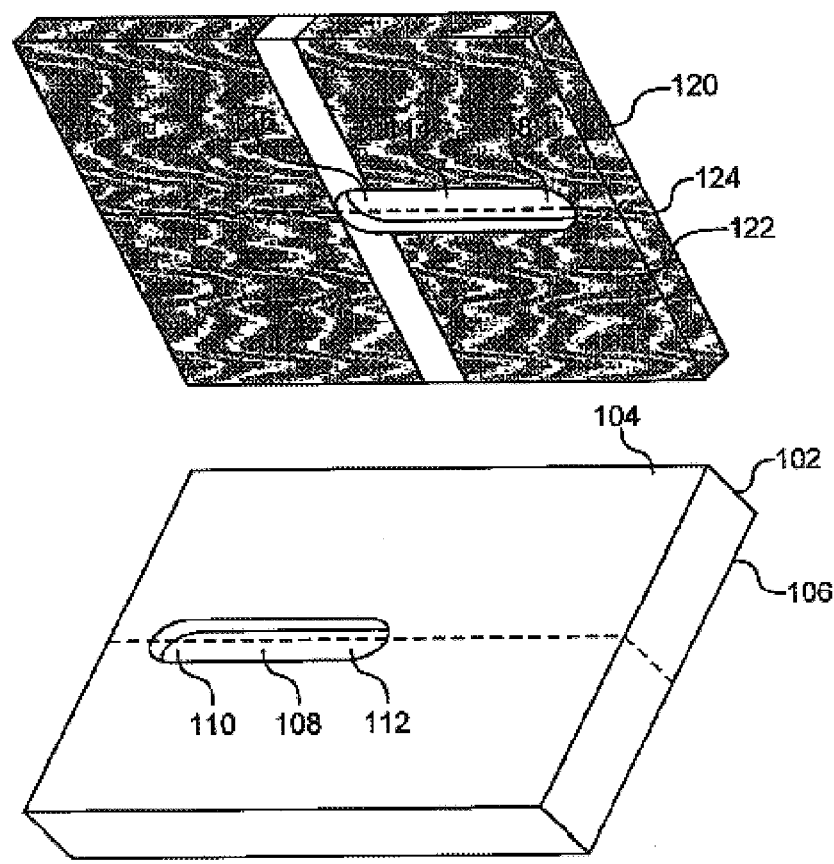
FIGS. 4A–4C, collectively referred to as FIG. 4, illustrate another version of the inventive device, wherein an active area of the elastic sheet, after actuation, is deflected toward a substrate surface to obstruct a fluid-transporting feature formed as a combination of channels in both the lower surface of the elastic sheet and the upper substrate surface.
Figure 4B:
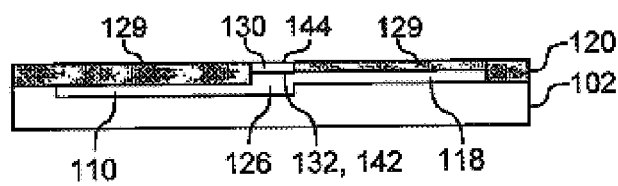

FIG. 4 illustrates an example of the inventive device similar to that depicted in FIG. 3 in that a conduit 126 is also formed between the elastic sheet 120 and the substrate 102. However, the conduit 126 is formed from two fluid-transporting features, each in the form of a channel. The first channel 108 has two termini indicated at 110 and 112, and is located on the upper substrate surface 102. The second channel 114 also has two termini, indicated at 116 and 118, and is located on the lower surface of the elastic sheet 122. As illustrated in FIG. 4B, the elastic sheet 120 is arranged over the substrate such that the lower surface 122 of the elastic sheet is in contact with the upper substrate surface 102, and terminus 112 of the first channel 108 overlaps terminus 116 of the second channel 114. As a result, a conduit 126 is formed. The conduit 126 contains a fluid flow path that extends from terminus 110 to terminus 118 in an unactuated state.

Figure 4C:
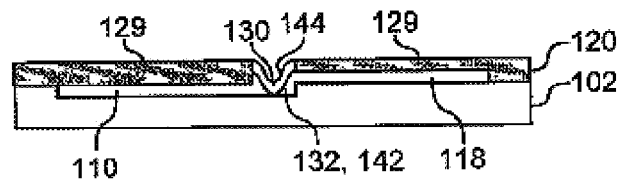

The shaded area 129 represents a locus of immobilization points at which the elastic sheet 120 is immobilized with respect to the substrate 102. The unshaded area corresponds to conduit 126, and the active area 130 of the elastic sheet is located at terminus 116 of channel 114. Also provided are two electrodes, indicated at 142 and 144, each in contact with the active area. These electrodes allow an electric field to be applied to the active area upon nonmechanical actuation. As illustrated in FIG. 4C, the lower surface 132 of the active area 130, after actuation, is deflected toward terminus 112 of the substrate channel 108, thereby resulting in the fluid isolation of the ends of conduit 126.

In another embodiment, the inventive fluid flow control device comprises a substrate having a plurality of fluid-transporting features formed on an upper surface thereof and an elastic sheet immobilized with respect to the substrate at a plurality of immobilization points. The elastic sheet has a plurality of active areas each at least partially contained between two immobilization points. Each fluid-transporting feature on the substrate surface directly faces an active area of the elastic sheet. Optionally, a plurality of electrodes is arranged such that at least two electrodes contact at least one active area. An actuation means is provided for deflecting each active area toward or away from the upper surface of the substrate.

While in some instances, the active areas may be actuated synchronously, it is preferred that the actuation means allow for individual actuation of each active area. Generally, at least one of the active areas, after actuation, may be deflected toward the upper surface of the substrate. In addition or in the alternative, at least one of the active areas, after actuation, may be deflected away from the upper surface of the substrate. Typically, though, some active areas are deflected toward, while other active areas are deflected away from, the upper surface of the substrate. When the actuation means is adapted to apply an electric field to each of the active areas, a plurality of electrodes is placed in contact with at least one active area. To allow actuation of all of the active areas through the application of an electric field, the total number of electrodes for the device may be equal to or greater than one plus the number of active areas on the elastic sheet.

Typically, the electrodes are placed on opposing surfaces of the active area. That is, at least one electrode is located at the upper surface of the elastic sheet, and at least one electrode is located at the lower surface of any of the active areas. In a simple construction, one of the electrodes may contact substantially all of the active areas. The electrode that contacts substantially all of the active areas may be located on either the upper or lower surface of the elastic sheet.

FIG. 5 illustrates an example of this device. Generally, this device is similar to that depicted in FIG. 2 in that the substrate is the same. The elastic sheet, however, has two active areas indicated at 130 and 131. As shown in FIG. 5B, the elastic sheet 120 is substantially immobilized over the upper surface 104, as indicated by the shaded areas. The first active area 130 of the elastic sheet is arranged over the entirety of the upper surface opening 116 and over only a portion of the channel 108, specifically terminus 110. The second active area 131 is arranged over approximately the midpoint between termini 110 and 112 of channel 108.

When neither active area is actuated, as illustrated in FIG. 5B, the lower surface 122 of the elastic sheet 120, in combination with the channel 108, defines a conduit 126 and provides a fluid-tight seal against the upper surface opening 116 of the conduit 114. Thus, conduit 114 and 126 are fluidly isolated from each other, while termini 110 and 112 fluidly communicate with each other. When the active areas are actuated, as illustrated in FIG. 5C, the lower surface 132 of the first active area 130 is deflected away from the upper surface 104 of the substrate 102. As a result, the first active area, in combination with the upper surface of the substrate, defines a fluid-transporting feature 136 that provides fluid communication between the conduits 114 and 126. However, the lower surface 134 of the second area is also deflected toward the interior surface of channel 108. Thus, termini 110 and 112 of channel 108 are now fluidly isolated from each other.

Other electrode configurations are also possible. For example, the device may exhibit "electrodeless" or "monolithic" configurations. In some instances, the invention may be employed in conjunction systems and methods that employ an electroactive polymer and one or more electrodes that do not contact the polymer. In such systems, a noncontact electrode communicates charge to or from a portion of the polymer. In some instances, the noncontact electrode comprises a charge source such as a field emitter that transmits the charge. The charge may be transmitted through a medium such as air, a vacuum, or a specialized gas that facilitates transfer of charge between the electrode and the polymer. The medium may also comprise ionized gases, inert gases and liquids (supercritical or otherwise. The charge may include positive or negative ions or electrodes that may be used for actuation, generation, sensing, or to diminish actuation applied to polymer in one or more specific polymer portions. These systems are described in detail in U.S. Ser. No. 10/059,033 ("Non-Contact Electroactive Polymer Electrodes," inventors Pelrine and Kornbluh, filed on Jan. 29, 2002), published on Jul. 31, 2003 as U.S. Patent Application Publication No. 20030141787. Optimal voltages needed to transmit such charges and other operating parameter can be determined through routine experimentation upon examination of application.

Each of the FIGS. 1–5 illustrates a device, wherein the upper surface of the substrate is substantially planar. The planar substrate surface is particularly suited for microfluidic applications, though bulk fluid flow control devices may also employ a planar substrate surface. Accordingly, any of the fluid-transporting features may be a microfeature such as a microchannel, microconduit, or microchamber. Nevertheless, it is not a requirement that the substrate have any planar surfaces. The substrate may contain curved or angular surfaces that are external or internal to the device. For example, when the upper surface of the device represents a lumen surface, the inventive device may be constructed as a peristaltic pump. The deflection of the elastic sheet may constrict the interior surface of the lumen and provide a sequential squeezing action to force fluid through the lumen. In addition, the upper surface of the device may represent an exterior surface of cylindrical substrate. In short, the substrate surface may conform to any of a number of topologies, planar or nonplanar.

Peristaltic pumping action may be employed in conjunction with microfluidic device exhibiting planar surface configurations as well. It is also possible to use a continuous active area wherein charge is applied at one immobilization point and slowly flows to other regions. Such pumping action and other electroactive polymer deflection modes are described, for example, in International Publication No. WO01/59852, wherein monolithic device configurations are described.

Thus, the invention provides a number of methods for controlling fluid flow. Each of the methods involves providing a device comprising a substrate and an elastic sheet immobilized with respect thereto at a minimum of two immobilization points. The elastic sheet has an active area contained between the immobilization points. In one method, for example, the lower surface of the active area of the elastic sheet, prior to actuation, is in fluid-tight contact with an upper surface of the substrate. The active area may then be deflected away from the upper surface of the substrate, thereby forming a fluid-transporting feature between the active area and the upper surface of the substrate. In another method, two electrodes are placed in contact with the active area such that fluid may flow between a lower surface of the active area and an upper surface of the substrate prior to the actuation of the active area. An electric potential is then applied to the electrodes, which deflects the active area toward the upper surface of the substrate such that fluid-tight contact is achieved between the surfaces.

In any of the above embodiments, suitable materials for forming the substrates are selected based upon physical and chemical characteristics that are desirable for proper functioning of the device. In cases wherein the substrate represents a component of a microfluidic device, the substrate must be fabricated from a material that enables formation of high definition (or high "resolution") features of micrometer or submicrometer dimensions, e.g., microchannels, chambers, and the like. That is, the material must be capable of being microfabricated to produce desired miniature surface features using, e.g., dry etching, wet etching, laser etching, laser ablation, molding, casting embossing, surface micro-machining, and bulk-micromachining. For example, laser ablation may be employed wherein short pulses of intense ultraviolet light are absorbed in a thin surface layer of material. Laser ablation may allow the perimeter of ablated features to replicate the shape of the incident optical beam with precision on the scale of about one micrometer or less. Preferably, the substrate is capable of being microfabricated in such a manner as to form features in, on, and/or through the surface of the substrate. Microstructures can also be formed on the surface of a substrate by adding material thereto.

All substrate materials used should be chemically inert and physically stable with respect to any substance with which they come into contact during use (e.g., with respect to pH, electric fields, etc.). In addition, the substrate typically should have a rigidity of about 10 times that of the elastic sheet. Suitable materials for forming the substrate include, but are not limited to, metals, ceramics, semiconductors, polymers, composites thereof, and laminates thereof. To take advantage of commercially available technologies, the substrate material may include materials normally associated with the semiconductor industry, in which such microfabrication techniques are regularly employed. For example, the substrate may be formed from silica-based materials such as glass, quartz, silicon, or polysilicon, as well as other substrate materials, such as gallium arsenide and the like. Similarly, commercially available ceramic materials such as aluminum oxide, zirconium oxide, titanium oxide, and the like may be employed as well. Suitable metals include, but are not limited to, pure and alloy forms of aluminum, iron, and platinum. Further, suitable polymeric substrate materials will typically be organic polymers that are homopolymers or copolymers, naturally occurring or synthetic, crosslinked or uncrosslinked. Specific polymers of interest include, but are not limited to, polyimides, polycarbonates, polyesters, polyamides, polyethers, polyurethanes, polyfluorocarbons, polystyrenes, poly(acrylonitrile-butadiene-styrene) (ABS), acrylate, acrylic acid polymers such as polymethyl methacrylate, and other substituted and unsubstituted polyolefins, and copolymers thereof. For any of these substrate materials, it will often be desirable to provide a coating or layer to serve as a mechanical, chemical, and or electrical barrier when appropriate.

As is the case with the substrate, suitable materials for forming the elastic sheet are selected based upon physical and chemical characteristics that are desirable for proper functioning of the device. All elastic sheet materials used may be chemically inert and physically stable with respect to any substance with which they come into contact during use (e.g., with respect to pH, ion concentration, etc.). Generally, the elastic sheet may be comprised of any of elastic material, i.e., materials formed from molecules that undergo conformational (or in some cases, intermolecular) displacement in response to a force, but resume their prior shape when the force is removed. The elastic material deforms when force is applied, but then returns to its original shape when the force is removed. A low modulus of elasticity, of no more than about $10^8$ Pa, is preferred. Typically, the Young's modulus for elastic materials suitable for use in the present invention is about $10^3$ to about $10^8$ Pa, preferably about $10^4$ to about $10^7$ Pa, and optimally about $5\times10^4$ to about $10^7$ Pa. However, elastic materials having a Young's modulus outside of these ranges may also be employed when needed for a particular application. In addition, the threshold actuation pressure for the elastic material should be typically about $5\times10^4$ to about $10^7$ Pa, and preferably between about $3\times10^5$ to about $3\times10^6$ Pa. At pressures less than the threshold actuation pressure, the active area typically remains undeflected. The proper selection of a threshold actuation pressure tends to reduce leakage or other uncontrolled fluid flow.

When the elastic sheet is comprised of a polymer, the polymer is preferably comprised of one or more elastomers. Elastomers are polymers that exist exhibit elastic properties because, in response to a force, the polymer chains readily undergo torsional motion to permit the chains to uncoil or stretch, with the chains recoiling or contracting to assume their prior shape when the force is withdrawn. While not wishing to be bound by theory, elastomers are typically said to be polymers that exist at a temperature between their glass transition temperature and their liquefaction temperature. Elastomers are typically selected from silicones, urethanes, fluorinated polymers, nitrile rubbers, alkylene rubbers, diene rubbers, mixtures thereof, and copolymers thereof. The present elastic sheet may be readily and preferably fabricated from any silicone polymer, since silicone polymers probably have the greatest structural variety, and may have an enormous number of commercially available formulations. Typically, silicones may be crosslinked through a vinyl-to-(Si—H) reaction (as in the case of RTV 615 from General Electric of Waterford, N.Y.), though other crosslinking methods are known in the field of silicone polymer chemistry. Another suitable silicone material is NuSil CF19-2186 from NuSil Technology of Carpenteria, Calif. Still another suitable silicone material is Dow Corning HS3 from Dow Corning of Wilmington, Del. Dow Corning 730, also from Dow Corning, represents a suitable fluorosilicone.

Diene polymers are typically suitable for use in the elastic sheet as well. Polyisoprene, polybutadiene, and polychloroprene are all commercially available polymers polymerized from diene monomers. Thus, all have one double bond per monomer when polymerized. This double bond allows the polymers to be converted to elastomers by crosslinking. When crosslinking occurs through vulcanization, sulfur is used to crosslink the double bonds via heating. Alkylene polymers such as polyisobutylene, on the other hand, have no double bonds. However, an alkylene polymer may be crosslinked to form an elastomer by including a small amount (<1%) of isoprene in the polymerization. The isoprene monomers give pendant double bonds on the polyisobutylene backbone, which may then be vulcanized as above.

Some acrylics, such as any acrylic in the 4900 VHB acrylic series from 3M Corporation of St. Paul, Minn., have properties suitable for use as the material for the elastic sheet of this invention. Thus, in some instances, polymers suitable for use with the present invention may be made from any monoethylenically unsaturated monomer (or combination of monomers) homopolymerizable to form a polymer having a glass transition temperature of at most about 0° C. Also known in the art are acrylic elastomers comprising mixtures of aliphatic acrylates that exhibit elasticity due to a combination of branched aliphatic groups and crosslinking between the acrylic polymer chains. Suitable monoethylenically unsaturated monomers include isooctyl acrylate, 2-ethylhexyl acrylate, decyl acrylate, dodecyl acrylate, hexyl acrylate, isononyl acrylate, isooctyl methacrylate, and 2-ethylhexyl methacrylate. Any of the monomers may also include one or more halogens such as fluorine Similarly, polyurethanes may also be employed as elastomers. Polyurethanes may be produced, for example, from diisocyanates and dialcohols or diamines. Since there are a large variety of diisocyanates, dialcohols, and diamines, there are many different types of polyurethanes.

In many cases, materials used in accordance with the present invention are commercially available polymers. The commercially available polymers include, for example, silicone elastomers, polyurethanes, polyvinylidene fluoride copolymers and adhesive elastomers. In addition, polymers incorporating materials such as chlorosilanes or methyl-, ethyl-, and phenylsilanes, and polydimethylsiloxane (PDMS), such as Dow Chemical Corporation Sylgard 182, 184 or 186; or aliphatic urethane diacrylates such as (but not limited to) Ebecryl 270 or Irr 245 from UCB Chemical; may also be used. Using commercially available materials provides a cost-effective option and simplifies fabrication.

A number of copolymers represent suitable elastomers. Styrene-butadiene-styrene (SBS) block copolymer is a thermoplastic elastomer that is produced by a "living" anionic polymerization process. This process does not involve a natural chain-terminating step, so "live" polymer ends can exist in the cured polymer. Copolymers comprising silicone and acrylic moieties may be employed as well. In such cases, crosslinking agents may be added. In some cases, materials suitable for use with the present invention may contain combinations of one or more of the above listed materials. For example, one suitable polymer is a blend including a silicone elastomer and an acrylic elastomer.

Additives such as plasticizers, antioxidants, and high dielectric constant particulates may be incorporated in the elastomeric materials discussed herein above. Examples of suitable plasticizers include high molecular weight hydrocarbon oils, high molecular weight hydrocarbon greases, Pentalyne H, Piccovar® AP Hydrocarbon Resins, Admex 760, Plastolein 9720, silicone oils, silicone greases, Floral 105, silicone elastomers, nonionic surfactants, and the like. For example, RTV 615 may be diluted with GE SF96-50 Silicone Fluid. This serves to reduce the viscosity of the uncured elastomer and reduce the Young's modulus of the cured elastomer. Essentially, the crosslink-capable polymer chains are spread further apart by the addition of "inert" polymer chains. RTV 615 cures at up to 90% dilution, with a dramatic reduction in Young's modulus. It should be noted, however, that additives should be selected according to the desired functionality of the inventive device. In addition, since the inventive device is employed to control fluid flow, fluid flow may result in leaching of additives such as volatile or fluid-soluble solid antioxidant.

In addition, the elastic material is typically an electrically insulating material when the actuation means applies an electrostatic force or electric field change to the elastic sheet in order to deflect the sheet. Thus, the elastic material may be selected according to electrical breakdown strength or dielectric constant. Typically, the material exhibits a dielectric constant of about 2 to about 20, and preferably about 2.5 to about 12. Halogenated polymers, such as fluorinated or chlorinated polymers, commonly exhibit a higher dielectric constant than the base polymer. Otherwise, the elastic material may be selected based upon one or more application demands, such as a wide usable temperature range, repeatability, accuracy, low creep, reliability, or endurance.

Electroactive polymers as described in WO01/06579 and WO01/06575 are particularly suited for the inventive device. Thus, the invention also provides a fluidic control device comprising an electroactive polymer attached to the upper surface of the substrate. The electroactive polymer comprises at least one active area, and at least two electrodes in contact with each active area. The electrodes are arranged in a manner that causes the polymer in the active area to deflect in response to a change in electric field.

As shown in FIGS. 1 to 5, the elastic sheet may have a substantially uniform thickness if it contains no fluid-transporting feature. A substantially uniform thickness is preferred to simplify construction of the inventive device, though this is not a requirement. A uniform thickness at the active area is particularly desirable to provide precision in deflection control. Thus, in some instances, the elastic sheet may have one thickness at the active area and another thickness at other areas. In some instances, when the elastic sheet is provided as a freestanding film, the sheet exhibits a thickness of at least about 5 micrometers to provide for structural integrity of the sheet and for ease in handling. Typically, a freestanding elastic sheet has a thickness of about 10 to about 5000 micrometers. Preferably, such a sheet has a thickness of about 25 to about 250 micrometers. It should be noted that elastic sheets may be formed in situ, resulting in an even lesser thickness. For example, elastic materials may be dissolved in a solvent to form a solution, and applied as a thin fluid film. Once the solvent is evaporated, the remaining elastic material forms a thin film in situ. As another example, precursor material may be applied as a thin fluid film and crosslinked in situ to provide the thin film sufficient mechanical integrity for use in the invention.

In some cases, at least the active area of the elastic sheet is prestrained. However, in many cases, device construction is simplified when the entire elastic sheet is prestrained. It has been found that prestrained polymers exhibit improved electrical-to-mechanical conversion of energy. A polymer may undergo prestraining in one or more directions. The degree of prestrain can be described as the change in dimension in a direction after prestraining relative to the dimension in that direction before prestraining. Prestrain may be applied uniformly over a portion of the polymer to produce an isotropic prestrained polymer, or applied unequally in different directions to produce an anisotropic prestrained polymer. Linear strain and area strain may be used to describe the deflection of a prestrained polymer. Prestraining tends to increase the dielectric breakdown strength of the polymer and allow more charge to be placed on the polymer. Other aspects of prestrained polymers are discussed in WO01/06575 and WO01/06579. Prestraining, of course, will typically reduce the thickness of the elastic sheet.

In order to control the deflection of the active area, the active area may be "biased" to deflect in only one direction. Various ways in which active area biasing may be effected are generally described in International Publication No. WO98/35529. Thus, the lower surface of any active area may be biased to deflect away from or toward the substrate. In addition, the manner of active area deflection may be controlled as well. Referring to FIG. 1 as an example, if it is desired for the active area to bow (shown in FIG. 1C) rather than to wrinkle upon actuation, the active area 130 should be relatively stiff. Stiffness will impart active areas with a tendency to bow in a single arch as shown in FIG. 1C, as opposed to distorting as multiple wrinkles. Rigidity may be achieved through selecting an elastic sheet material having a high Young's modulus and/or increasing the thickness of the active region. In addition or in the alternative, material can be deposited on the lower surface 132 to enhance the lower bending stiffness and cause the active area to bow as shown in FIG. 1C. Such an approach is similar to unimorph actuators known in the art, with the exception that both ends are fixed at the immobilized areas 129. It should also be noted that fluid present between the active area of the elastic sheet and the substrate surface also plays a role in the deflection of the active area. For example, if the fluid is at a higher pressure than pressure at the upper surface 134 of the elastic sheet, then the active area 130 will naturally bow outward as shown in FIG. 1.

When the elastic sheet is constructed from electroactive polymers, the device typically further comprises two electrodes in contact with the active area of the elastic sheet, wherein the actuation means is operatively connected to the electrodes. The electrodes are optimally located on opposing surfaces of the active area. The electrodes are preferably compliant and can undergo strains similar to those of the elastic sheet in order to allow deflection of the active area. That is, the electrodes should not be so mechanically stiff so as to impede the deflection of the active area. In addition, the electrodes optimally do not increase the amount of energy needed to actuate the active area of the elastic sheet.

In some instances, the electrodes may be formed from electrically conductive particles that are adhered to or otherwise immobilized with respect to the active area. Compliant electrodes of the present invention may also include colloidal suspensions. Colloidal suspensions contain submicrometer-sized electrically conductive particles, such as graphite, silver, or gold, in a liquid vehicle. Generally speaking, any colloidal suspension having sufficient loading of conductive particles may be used as an electrode in accordance with the present invention. For example, a conductive grease including colloidal sized conductive particles may be mixed with a conductive silicone including colloidal sized conductive particles in a silicone binder to produce a colloidal suspension that cures to form a conductive semi-solid. An advantage of colloidal suspensions is that they may be patterned on the surface of a polymer by spraying, dip coating, or other techniques that allow for a thin uniform liquid coating. To facilitate adhesion, a binder may be added to the electrode. For example, water-based latex rubber or a silicone may be added as a binder to a colloidal suspension.

Carbon is a particularly suitable electrode material. For example, a conductive electrode may be formed by depositing carbon black on the active area surface, either by spreading the dry powder, or by exposing the active area surface to a suspension of carbon black in a solvent that causes swelling of the active surface. In addition or in the alternative, the electrode may be formed by electrostatic deposition, or by a chemical reaction that produces carbon. Compliant carbon electrodes of the present invention may be formed from carbon grease. The conductive grease provides compliance in multiple directions. Carbon particles may be added to increase the conductivity of the electrode. By way of example, carbon particles may be combined with a polymer binder such as silicone to produce a carbon grease that has low elasticity and high conductivity. Other materials may be blended into the conductive grease to alter one or more material properties.

Carbon fibrils and nanotubes exhibit an ideal geometry for use as an electrode material. Because carbon fibrils and nanotubes have a high geometric aspect ratio, they form a network that conducts electricity better than an equivalent weight of carbon particles that have a geometric aspect ration closer to unity. However, other forms of carbon may be suitable as well and include, but are not limited to graphite and carbon black.

In addition, the electrode may be formed from a metallic film, having sufficient conductivity, deposited on a surface of the active area. Such metallic films may be formed, for example, by sputtering a thin layer of gold, silver, copper, or aluminum. In addition to the formation of a metallized membrane by sputtering, other metallization approaches such as chemical epitaxy, evaporation, electroplating, and electrodeless plating may be employed. Purely metallic electrodes may undergo strains of about 5% before they lose their conductivity. However, when employed in combination with other materials, metallic electrodes may be employed in the present invention for elastic sheets constructed to undergo greater strains.

There are numerous methods for immobilizing portions of the elastic sheet relative to the substrate. For example pressure may be applied, e.g., by using external means to hold the pieces together (such as clips, tension springs, or another form of clamping apparatus). In addition, an adhesive may be employed. Typically, the adhesive is applied between the substrate and the elastic sheet in a pattern that corresponds to immobilization points at which the substrate and the elastic sheet are to be attached. However, the adhesive may be incorporated into the elastic sheet itself. Moreover, the elastic sheet may be chemically attached to the substrate surface, on which the elastic sheet may be formed in situ. Other means for immobilizing portions of the elastic sheet with respect to the substrate are known in the art. In any case, the elastic sheet may be directly or indirectly affixed to the substrate. As shown in each of FIGS. 1–5, the elastic sheet may be immobilized with respect to the upper surface of the substrate. It is preferred that substantially the entire elastic sheet except for the active area be immobilized with respect to the substrate.

The immobilization and adhesion of the elastic sheet with respect to the substrate can also be augmented by additional means. For example, uniform external pressure may be imposed on the upper surface of the elastic sheet, e.g., by a fluid or foam. Pressure can also be applied by electrostatic forces when fluid in contact with the elastic sheet is an insulator. The active area may be actuated by any of a number of actuation means including mechanical and non-mechanical means. Examples of actuation means are discussed in WO01/01025 and include hydrostatic, magnetic, and thermal actuation means. In addition, photo-switching (optical) actuation means may be employed. It is generally preferred that the actuation means comprise a nonmechanical means such as one adapted to apply an electric field to the active area. Electric fields may be applied through electrode or electrodeless means. In some instances, when the fluid transported through the fluid control device is conductive, the fluid itself may serve as an electrode. The electric field results in the generation of electrostatic force to deflect the active area(s). Suitable actuation voltages for the elastic sheet may differ based on the properties of the specific material from which the sheet is formed (e.g., the dielectric constant) as well as on the dimensions of the sheet (e.g., the thickness between electrodes). By way of example, electric fields for elastic sheet actuation may range in magnitude from about 0 V/m to about 440 MV/meter. Actuation voltages in this range may produce a pressure in the range of about 0 Pa to about 10 MPa. Typically, the actuation means is adapted to deflect the active area through a linear strain of at least about 10 percent. Preferably, the actuation means is adapted to deflect the active area through a linear strain of at least about 50 percent.

When a plurality of active areas is provided, the actuation means may allow for individual actuation of each active area. For example, a computer may be easily used to create and operate a fully programmable fluidic system. The active areas may be formed in small squares or other shapes analogous to pixels in a display. Depending on the number and location of the areas actuated, flow channels, pumps, and mixing channels may be formed in any of a number of combinations. The location and type of component can then be changed by changing the regions addressed. Addressing means similar to those used for display technologies known in the art may be used. For example, electron beam and optical addressing means may be used. In particular, examples of electron beam addressing means suitable for use with the invention are described in U.S. Ser. No. 10/059,033 ("Non-Contact Electroactive Polymer Electrodes," inventors Pelrine and Kornbluh, filed on Jan. 29, 2002), published on Jul. 31.2003 as U.S. Patent Application Publication No. 20030141787. Aside from their obvious advantages, e.g., small size, low cost, and disposability, inicrofluidic technologies employing elastic control may allow the creation of more generic systems "on the fly," thus enabling a wide variety of additional applications. This, of course, may involve addressing individual elements from a computer-based system.

In another embodiment, the invention relates to a method for forming a fluid flow control device. The method involves providing a substrate having an upper surface and immobilizing an elastic sheet relative to the substrate at a minimum of two immobilization points. The elastic sheet has an upper surface, an opposing lower surface that faces the upper surface of the substrate, and an active area contained between the immobilization points. An actuation means is operatively connected to the active area such that the active area may be deflected away from or toward the upper surface of the substrate upon operation of the actuation means. Typically, at least one fluid-transporting feature is formed on the upper surface of the substrate, under the active area of the elastic sheet, before the elastic sheet is immobilized with respect to the substrate. Immobilization may involve any of the above-described means but typically comprises applying an adhesive between the elastic sheet and the substrate at the attachment immobilization points. In addition, an electrode is typically formed on a surface of the active area and the actuation means is operatively connected to the electrode. In some instances, the electrode may be formed before the elastic sheet is immobilized relative to the substrate. In other instances, the electrode may be formed after such immobilization.

Thus, variations of the present invention will be apparent to those of ordinary skill in the art. For example, possible variations on the geometry of the inventive device are abundant. In some instances, additional substrates may be employed to form three-dimensional fluid-transporting networks. Fluid-transporting features may be formed on opposing surfaces as mirror image of each other. With respect to the active areas, fluid control may be provided through overlapping active areas as well as through discrete active areas. In addition, the shape of the active areas may be tailored according to the particular functionality of the active areas. In some instances, the elastic sheet and/or electrodes may be transparent to facilitate optical measurements. Moreover, the materials and operative conditions for the inventive fluid control devices must be selected based upon the properties of the fluids that would be employed with the inventive device. Thus, for example, no electrode material that contacts the fluid should generally interact with the fluid, and the actuation of the active areas should not involve using voltages that produce stray electric fields in excess of that which can be tolerated by the fluids. In general, the electric field is contained between the upper and lower surfaces of the elastomeric film. Other variations may become apparent upon examination of International Publication Nos. WO01/06579, and WO01/06575.

It is to be understood that while the invention has been described in conjunction with the preferred specific embodiments thereof, that the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

What is claimed is:

1. A fluid flow control device comprising:
 (a) a substrate having an upper surface adapted to contact a flowing fluid;
 (b) an elastic sheet having an upper surface and an opposing lower surface, with the lower surface facing the upper surface of the substrate, wherein the elastic sheet (i) is immobilized with respect to the substrate at a minimum of two immobilization points, and (ii) has a deflectable active area at least partially contained between the immobilization points; and
 (c) an actuation means for deflecting the active area of the elastic sheet away from the upper surface of the substrate.

2. The device of claim 1, wherein the upper surface of the substrate is substantially planar.

3. The device of claim 1, further comprising a fluid-transporting feature on the upper surface of the substrate and at least partially contained between the immobilization points.

4. The device of claim 3, wherein the fluid-transporting feature is located entirely within a bounded region defined by the immobilization points.

5. The device of claim 3, comprising a plurality of fluid-transporting features on the upper surface of the substrate and at least partially contained between the immobilization points.

6. The device of claim 3, wherein the fluid-transporting feature is a microfeature.

7. The device of claim 6, wherein the microfeature is a microchannel or a microconduit.

8. The device of claim 1, wherein the substrate has a rigidity of at least 10 times that of the elastic sheet.

9. The device of claim 1, wherein the substrate is comprised of a material selected from the group consisting of metals, ceramics, semiconductors, polymers, composites thereof, and laminates of any of the foregoing.

10. The device of claim 1, wherein the elastic sheet is comprised of a polymeric material.

11. The device of claim 10, wherein the polymeric material is an elastomer.

12. The device of claim 11, wherein the elastomer is selected from silicones, urethanes, fluorinated polymers, nitrile rubbers, alkylene rubbers, diene rubbers, copolymers thereof, and mixtures of any of the foregoing.

13. The device of claim 1, wherein the elastic sheet has a substantially uniform thickness.

14. The device of claim 1, wherein at least the active area of the elastic sheet is prestrained.

15. The device of claim 14, wherein the entire elastic sheet is prestrained.

16. The device of claim 1, wherein the actuation means comprises a nonmechanical actuation means.

17. The device of claim 16, wherein the nonmechanical means comprises a means for applying an electric field to the active area.

18. The device of claim 17, further comprising two electrodes in contact with the active area of the elastic sheet wherein the actuation means is operatively connected to the electrodes.

19. The device of claim 18, wherein the electrodes are located on opposing surfaces of the elastic sheet.

20. The device of claim 18, wherein at least one of the electrodes is comprised of a plurality of electrically conductive particles in electrical communication with each other and adhered to the active area.

21. The device of claim 20, wherein the electrically conductive particles are comprised of carbon.

22. The device of claim 18, wherein at least one of the electrodes is comprised of a metallic film deposited on the upper or lower surface of the elastic sheet with at least a portion of the metallic film deposited within the active area.

23. The device of claim 16, wherein the actuation means is adapted to deflect the active area through a linear strain of at least about 10 percent.

24. The device of claim 23, wherein the actuation means is adapted to deflect the active area through a linear strain of at least about 50 percent.

25. The device of claim 1, wherein substantially the entire elastic sheet except for the active area is immobilized with respect to the substrate.

26. The device of claim 1, wherein the upper surface of the elastic sheet represents an exterior surface of the device.

27. The device of claim 1, wherein the lower surface of the elastic sheet, prior to actuation, contacts the upper surface of the substrate.

28. The device of claim 27, wherein the lower surface of the elastic sheet, prior to actuation, conforms to the upper surface of the substrate.

29. The device of claim 1, wherein the lower surface of the elastic sheet, after actuation and in combination with the upper surface of the substrate, forms a fluid-transporting feature.

30. The device of claim 29, wherein the fluid-transporting feature is a conduit.

31. The device of claim 29, wherein the fluid-transporting feature is a chamber.

32. The device of claim 29, wherein the fluid-transporting feature is a microfeature.

33. The device of claim 29, wherein, following actuation, the maximum distance between the active area and the upper surface of the substrate is in the range of about 0.1 to about 10 times a dimension of the fluid-transporting feature.

34. The device of claim 33, wherein the maximum distance is about 0.5 to about 2 times the dimension of the fluid-transporting feature.

35. The device of claim 1, wherein the lower surface of the elastic sheet, prior to actuation and in combination with the upper surface of the substrate, forms a fluid-transporting feature.

36. A valved structure comprising a conduit through which fluid can flow and a flow adjustment means for increasing, decreasing, or stopping fluid flow at an immobilization point within the conduit, wherein the flow adjustment means comprises the device of claim 1.

37. A pumping system comprising a conduit through which fluid can flow, an inlet means through which fluid is introduced into the conduit, and a pumping means for increasing, decreasing or maintaining the flow of fluid into the inlet means, wherein the pumping means comprises the device of claim 1.

38. A mixing system comprising a chamber into which a plurality of fluids may be introduced, wherein the chamber has a controllably variable shape for mixing the fluids and comprises the device of claim 1.

39. A microfluidic device comprising:
(a) a substrate having at least two fluid-transporting microfeatures formed on an upper surface thereof;
(b) an elastic sheet having an upper surface and an opposing lower surface, with the lower surface facing the upper surface of the substrate, wherein the elastic sheet (i) is immobilized with respect to the substrate at a minimum of two immobilization points, and (ii) has a deflectable active area at least partially contained between the immobilization points; and
(c) an actuation means for deflecting the active area of the elastic sheet away from the upper surface of the substrate.

40. A fluid flow control device comprising:
(a) a substrate having a plurality of fluid-transporting features formed on an upper surface thereof;
(b) an elastic sheet having an upper surface and an opposing lower surface, with the lower surface facing the upper surface of the substrate, wherein the elastic sheet (i) is immobilized with respect to the substrate at a plurality of immobilization points, and (ii) has a plurality of deflectable active areas, wherein each of the active areas is at least partially contained between two immobilization points, and further wherein each fluid-transporting feature on the substrate surface directly faces an active area of the elastic sheet; and
(c) an actuation means for deflecting each active area of the elastic sheet away from the upper surface of the substrate.

41. The device of claim 40, wherein the actuation means allows for individual actuation of each active area.

42. The device of claim 41, wherein the actuation means is adapted to apply an electric field to each of the active area.

43. The device of claim 42, further comprising a plurality of electrodes in contact with at least one active area.

44. The device of claim 43, wherein the total number of electrodes is equal to or greater than one plus the number of active areas of the elastic sheet.

45. The device of claim 43, wherein the elastic sheet comprises an upper surface that opposes the lower surfaces of the active areas, wherein at least one electrode is located at the upper surface of the elastic sheet and at least one electrode is located at the lower surface of any of the active areas.

46. The device of claim 43, wherein one of the plurality of electrodes contacts substantially all of the active areas.

47. The device of claim 46, wherein the electrode that contacts substantially all of the active areas is located on the upper surface of the elastic sheet.

48. The device of claim 46, wherein the electrode that contacts substantially all of the active areas is located on the lower surface of the elastic sheet.

49. The device of claim 40, wherein the actuation means comprises a noncontact electrode.

50. The device of claim 49, wherein the noncontact electrode comprises a charge source.

51. The device of claim 50, wherein the charge source comprises a field emitter.

52. A fluid flow control device comprising:
(a) a substrate having an upper surface adapted to contact a flowing fluid;
(b) an elastic sheet having an upper surface and an opposing lower surface, with the lower surface facing the upper surface of the substrate, wherein the elastic sheet (i) is immobilized with respect to the substrate at a minimum of two immobilization points, and (ii) has a deflectable active area at least partially contained between the immobilization points; and
(c) at least two electrodes in contact with the active area of elastic sheet; and
(d) a nonmechanical actuation means for deflecting the active area towards or away from the upper surface of the substrate.

53. The device of claim 52, wherein the nonmechanical actuation means is adapted to apply an electric field to the active area by charging the electrodes.

54. The device of claim 52, wherein the nonmechanical actuation means is adapted to deflect the active area towards the upper surface of the substrate.

55. A microfluidic device comprising:
(a) a substrate having at least two fluid-transporting microfeatures formed on an upper surface thereof;
(b) an elastic sheet having an upper surface and an opposing lower surface, with the lower surface facing the upper surface of the substrate, wherein the elastic sheet (i) is immobilized with respect to the substrate at a minimum of two immobilization points, and (ii) has a deflectable active area at least partially contained between the immobilization points; and
(c) at least two electrodes in contact with the active area of the elastic sheet; and
(d) a nonmechanical actuation means for deflecting each active area towards or away from the upper surface of the substrate, thereby decreasing or increasing, respectively, fluid communication with the fluid-transporting features.

56. A fluid flow control device comprising:
(a) a substrate having a plurality of fluid-transporting features formed on an upper surface thereof;
(b) an elastic sheet having an upper surface and an opposing lower surface, with the lower surface facing the upper surface of the substrate, wherein the elastic sheet (i) is immobilized with respect to the substrate at a plurality of immobilization points, and (ii) has a plurality of deflectable active areas, wherein each of the active areas is at least partially contained between two immobilization points, and further wherein each fluid-transporting feature on the substrate surface directly faces an active area of the elastic sheet; and
(c) a plurality of electrodes arranged such that at least two electrodes contact each active area; and
(d) an actuation means for deflecting each active area towards or away from the upper surface of the substrate.

57. The device of claim 56, wherein, at least one of the active areas, after actuation, is deflected towards the upper surface of the substrate.

58. The device of claim 56, wherein at least one of the active areas, after actuation, is deflected away from the upper surface of the substrate.

59. The device of claim 58, wherein at least one of the active areas, after actuation, is deflected toward the upper surface of the substrate.

60. The device of claim 56, wherein the actuation means allows for individual actuation of each active area.

61. A fluidic control device comprising:
(a) a substrate having an upper surface adapted to contact a flowing fluid; and
(b) an electroactive polymer attached to the upper surface of the substrate; the electroactive polymer comprising (i) at least one active area, and (ii) at least two electrodes in contact with each active area and arranged in a manner to cause the polymer in the active area to deflect in response to a change in electric field.

62. A method for forming a fluid flow control device, comprising the steps of:
(a) providing a substrate having an upper surface adapted to contact a flowing fluid;
(b) immobilizing an elastic sheet having an upper surface and an opposing lower surface with respect to the substrate at a minimum of two immobilization points such that the lower surface of the elastic sheet faces the upper surface of the substrate and an active area of the elastic sheet is positioned between the immobilization points; and
(c) operatively connecting an actuation means to the active area such that the active area may be deflected away from or toward the upper surface of the substrate upon operation of the actuation means.

63. The method of claim 62, further comprising, before step (b), (a') forming at least one fluid-transporting feature on the upper surface of the substrate.

64. The method of claim 63, further comprising, between steps (a') and (b), (a") ensuring that the fluid-transporting feature is located under the lower surface of the active area of the elastic sheet.

65. The method of claim 62, wherein step (b) comprises applying an adhesive between the elastic sheet and the substrate at the immobilization points.

66. The method of claim 62, further comprising, before step (c), (b') forming an electrode on a surface of the active area and operatively connecting the actuation means to the electrode during step (c).

67. The method of claim 66, wherein step (b') is carried out before step (b).

68. The method of claim 66, wherein step (b') is carried out after step (b).

69. A method for controlling fluid flow, comprising:
   (a) providing a device comprising a substrate and an elastic sheet immobilized with respect thereto at a minimum of two immobilization points, wherein the elastic sheet has an active area at least partially contained between the immobilization points and in fluid-tight contact with an upper surface of the substrate; and
   (b) deflecting the active area away from the upper surface of the substrate, thereby forming a fluid-transporting feature between the active area and the upper surface of the substrate.

70. A method for controlling fluid flow, comprising:
   (a) providing a device comprising a substrate and an elastic sheet immobilized with respect thereto at a minimum of two immobilization points, wherein the elastic sheet has an active area at least partially contained between the immobilization points and two electrodes in contact with the active area such that fluid may flow between the active area and an upper surface of the substrate; and
   (b) applying an electric potential to the electrodes to deflect the active area toward the upper surface of the substrate such that fluid-tight contact is achieved between the surfaces.

* * * * *

UNITED STATES PATENT AND TRADEMARK OFFICE
Certificate

Patent No. 7,052,594 B2            Patented: May 30, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ronald E. Pelrine, Louisville, CO (US); Roy D. Kornbluh, Palo Alto, CA (US); and John S. Bashkin, Fremont, CA (US).

Signed and Sealed this Seventh Day of August 2007.

ROY KING
*Supervisory Patent Examiner*
Art Unit 1742